United States Patent [19]

Bozon et al.

[11] 4,316,823

[45] Feb. 23, 1982

[54] METHOD OF MANUFACTURING A MONOLITHIC METALLIC MATRIX COATED WITH A CATALYSIS PROMOTING METAL OXIDE

[75] Inventors: Alfred Bozon, Erlensee; Edgar Koberstein, Alzenau; Hans-Dieter Pletka, Freigericht; Herbert Voelker, Hanau, all of Fed. Rep. of Germany

[73] Assignee: Degussa Aktiengesellschaft, Frankfurt am Main, Fed. Rep. of Germany

[21] Appl. No.: 208,082

[22] Filed: Nov. 18, 1980

[30] Foreign Application Priority Data

Nov. 20, 1979 [DE] Fed. Rep. of Germany ....... 2946685

[51] Int. Cl.$^3$ ..................... B01J 21/04; B01J 23/26; B01J 35/04
[52] U.S. Cl. ................... 252/465; 252/477 R; 422/180; 428/116
[58] Field of Search ................... 252/477 R, 465; 422/180; 428/73, 116

[56] References Cited

U.S. PATENT DOCUMENTS

| | | | |
|---|---|---|---|
| 3,920,583 | 11/1975 | Pugh | 252/465 |
| 4,186,172 | 1/1980 | Scholz | 422/180 |
| 4,220,625 | 9/1980 | Toh et al. | 252/477 R |

FOREIGN PATENT DOCUMENTS

2745841  4/1979  Fed. Rep. of Germany ...... 422/180

Primary Examiner—W. J. Shine
Attorney, Agent, or Firm—Beveridge, DeGrandi & Kline

[57] ABSTRACT

The invention relates to a method for the manufacture of a metallic matrix which is "monolithic", is coated with a catalysis promoting metal oxide and is disposed in a metal casing, in which the matrix is composed of alternately disposed plain and corrugated or folded metal sheets or plates, in which these sheets are stacked in a pile or are wound into a spiral. The method comprises a special resistance welding on the end faces of the matrix and arc welding of the side face of the matrix to the side of the casing, on which the metal oxide is applied.

26 Claims, 4 Drawing Figures

METHOD OF MANUFACTURING A MONOLITHIC METALLIC MATRIX COATED WITH A CATALYSIS PROMOTING METAL OXIDE

The present invention relates to a method for the manufacture of a mechanically stable, monolithic matrix of metal which is coated with a catalysis promoting metal oxide.

It is known to use so-called "monolithic" metal elements as constructional supports for catalysts for the purification of vehicle exhaust gases. Those skilled in the art will understand the term "monolithic" as meaning a support structure of the honey comb type having a round, oval, square or otherwise shaped base with parallel channels extending through it in the flow direction of the exhaust gas.

A catalyst matrix has heretofore been disclosed in a number of patents including U.S. Pat. No. 3,920,583; German Offenlegungsschrift No. 2,302,746; and German Offenlegungsschrift No. 2,450,664, the disclosures of which are incorporated herein by reference in their entireties. The known matrix is of scale-resistant steel and comprises an expanded metallic support, in which steel sheets of a specific and predetermined thickness are formed to be plain and other steel sheets are formed to be corrugated or folded and the sheets are arranged alternately in layers, in which the layers are stacked in a pile or wound into a spiral. As is the case with modern internal combustion engines, the requirements of mechanical stability for such metallic support structure are extremely high because, as a result of the ignition timing of a piston motor, extremely strong pulsations occur in the exhaust gas, and it has already been proposed in different ways to connect the superimposed plain and corrugated or folded steel sheets in a rigid manner by suitable measures.

German Offenlegungsschrift No. 2,720,323 discloses a support structure wherein the metal strips are connected together by means of electron beam welding into an assembly which is rigid per se and then fastened in a housing. This method of mechanical stabilization requires work under high vacuum in addition to costly apparatus. This patent also proposes to fasten the metal strips together and to provide a connection with the housing by laser welding. The drawback of this method, in addition to the provision of a costly high-powered laser, is the danger of working with a laser beam.

A method has now been discovered which enables the use of simple means to weld the strips together and to connect them to a housing without great cost. In summary, the present invention relates to a method of manufacturing a mechanically stable, monolithic metal matrix having a vertical axis and opposed end faces and which is coated with metal oxide to enable catalysis, is disposed in a metal jacket and comprises alternately superposed plain and corrugated or folded metal sheets of scale-resistant and high temperature resistant metal and in which the metal sheets are stacked in a pile or wound into a spiral. The present invention particularly resides in disposing one of the end faces of the matrix on a base electrode plate connected to one pole of a current source, and disposing the other, opposite end face on a second cover electrode plate connected to the other pole of the current supply, passing a welding current through the arrangement of matrix and electrode plates at least once, i.e. once or a plurality of times, to weld the metal plates at said end face disposed on said base electrode plate, then disposing the matrix in a way whereby the initially upper end face which is still unwelded lies on the base electrode plate and repeating the welding process, disposing and then welding the matrix in a metal jacket by means of an electric arc guided over the metal jacket in accordance with a required or predetermined weld path with the incorporation of at least one outer metal plate of said matrix, and coating the interior of the composite body thereby obtained with a metal oxide which promotes catalysis.

BRIEF DESCRIPTION OF THE DRAWINGS

The invention will be described in greater detail with respect to its embodiments with reference to the accompanying drawing in which.

Figure 1:
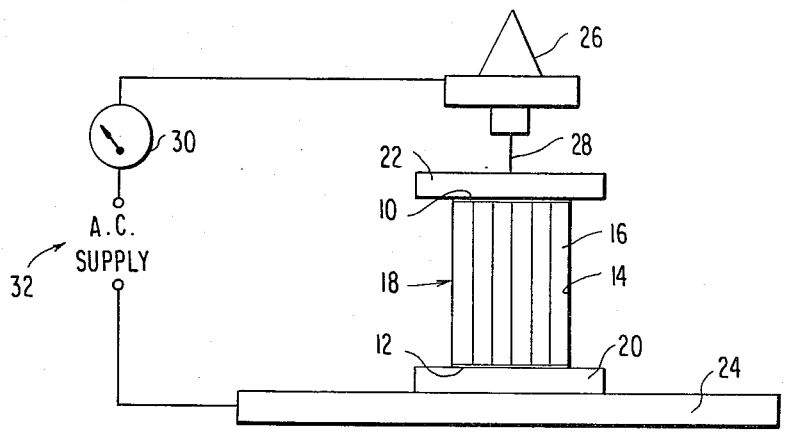
FIG. 1 is a schematic diagram illustrating an apparatus for welding the end faces of alternating plain and corrugated metal strips of a monolithic metal matrix.
Figure 3:
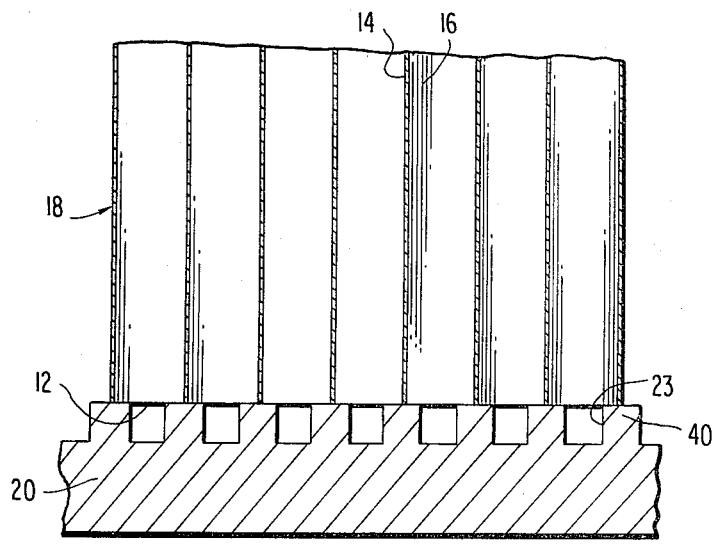
FIG. 3 is a cross-sectional view of a modified grooved electrode plate for welding the end faces of a matrix using the apparatus of FIG. 1.

In operation in practicing the method of the present invention and with particular reference to FIGS. 1 and 3, the end faces 10 and 12 of alternating plain metal sheets 14 and deformed metal sheets 16 of monolithic metal matrix 18 are disposed between and in electrical contact with electrode plates 20 and 22 made, for example, of copper and which may be either smooth as shown in FIG. 1 or provided with grooves 23 as shown in FIG. 3. The resulting assembly of matrix 18 and electrode plates 20 and 22 is disposed on base plate 24. Electrode support 26 carrying current conductor 28 is connected through ammeter 30 to a supply of alternating current 32 and base plate 24 is connected directly to current supply 32.

Thus, electrode plate 20 is connected through base plate 24 to one pole of the arc welding apparatus shown in FIG. 1. Electrode plate 22 which is applied to upwardly directed end face 10 of matrix 18 is connected through conductor 28 and electrode support 26 to the other pole of the arc welding apparatus. On actuation of the circuit for from 1 to 10 seconds, e.g. for 2 to 3 seconds with amperages of from 100 to 350 A, e.g., approximately 240 A, the edges of the plain and corrugated metal sheets 14 and 16 are welded together at lower end face 12. This welding process may be repeated several times. After welding at the lower end face 12, matrix 18 is reversed whereby end face 12 is disposed against electrode plate 22 and end face 10 is disposed against elelctrode plate 20 and the welding together of metal sheets 14 and 16 at end face 10 is carried out in the same manner.

Figure 2:
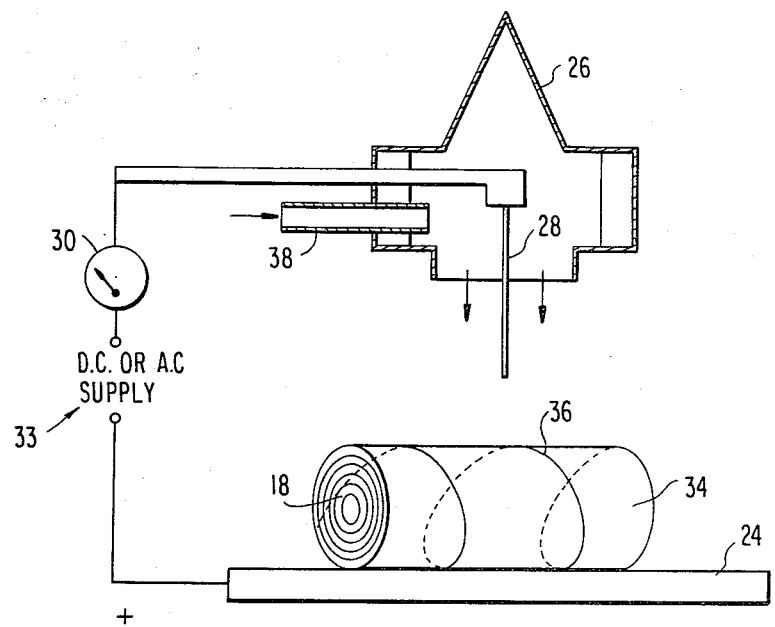
FIG. 2 is a schematic diagram illustrating an apparatus for applying a rigid weld connection between the welded monolithic metal matrix and the metal casing into which said matrix has been inserted.
Figure 4:
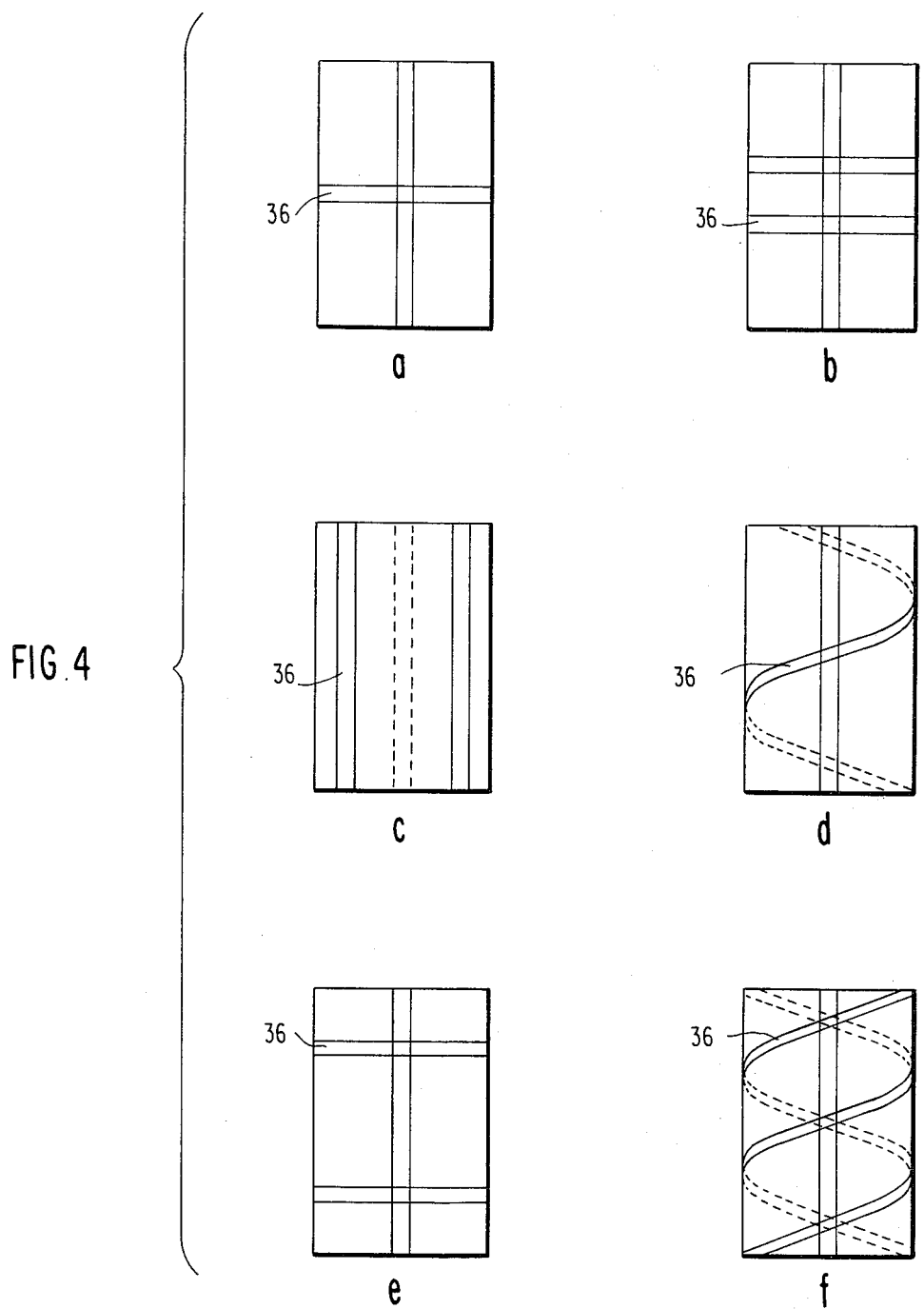
FIG. 4 illustrates diagrammatically various predetermined patterns of weld connections between the metal matrix and metal casing obtained with the apparatus of FIG. 2.

With particular reference to FIGS. 2 and 4, metallic support matrix 18 is inserted into metal casing 34, for example a tubular jacket. A rigid weld connection 36 between matrix 18 and casing 34 may be carried out with the same apparatus. In this respect the metal casing 34 containing the metal support matrix 18 is disposed in electrical contact with base plate 24 which is connected with one pole of the arc welding apparatus. Welding electrode 28 is connected through electrode support 26 to the other pole of the apparatus. In this embodiment, current supply 33 provides a source of direct or alternating current. This enables the production of a weld seam 36 having any course which surrounds casing 34 with the inclusion of at least the outermost layer of sheets 14 and 16 in matrix 18 and therefore provides a mechanically stable weld connection between matrix 18 and casing 34. Operation under a protective gas such as argon and/or helium may be advantageous or even necessary, depending on the material. For this purpose, the arrows in FIG. 2 show the flow of protective gas through conduit 38 from a source not shown.

The provision of grooves 23 in lower electrode plate 20 has proved to be particularly advantageous for the welding of the edges of sheets 14 and 16 at the end faces. Grooves 23 are formed in a way whereby the points of contact on the edges of the plain and corrugated metal sheets 14 and 16 lie in each case on the raised sections 40 of electrode plate 20. The spacing between raised sections 40 must be formed in a way whereby said raised sections correspond exactly to the spacing between the smooth plates 14 of the metal monolithic support matrix 18. It may also be advantageous to provide both electrode plates 20 and 22 with a grooved profile of this type.

The metallic support structure or support produced after welding is then coated with a conventional support material for catalysts and may be treated in this respect, for example, with solutions of active catalyst metal. In this way the individual sheets 14 and 16 are coated on their surfaces, for example by wash coats, with a support material which pormotes catalysis, in particular a metal oxide having a high surface area such as activated $Al_2O_3$. The elements cerium, zirconium, iron, nickel, rare earths or a combination of these in their oxide forms may be included in this metal oxide as catalyst additions thereto.

According to a preferred advantageous embodiment of the invention plate 20 provided with grooves 23 is used as the base electrode plate. A cover electrode plate 22 provided with such grooves may also be used. The optimum welding results are obtained if the spacings between raised sections 40 separating grooves 23 correspond to the spacings between plain sheets 14 of the matrix 18.

Uniformity of the end face welding may be increased by passing a welding current through the arrangement several times during the welding procedure and between each of these current applications rotating matrix 18 disposed on base electrode plate 20 slightly about its vertical axis. Protective gas may be used both for the welding of end faces 10 and 12 and for welding of casing 34 if the materials used require this procedure.

The method for coating the welded arrangement with a catalysis promoting metal oxide is carried out in particular by applying a dispersion of said catalysis promoting metal oxide to the composite body which has been welded at its end faces and within the casing and by removing the dispersion agent by drying and then by calcining the coated body.

It has proved to be convenient to use a scale-resistant and high temperature resistant chromium steel alloy containing the element aluminum at least for matrix 18. It is advantageous in this respect to pre-anneal the composite body in an atmosphere containing oxygen at a temperature between 600° and 1200° C. before coating with the metal oxide.

The present invention enables the use of simple means to weld alternate corrugated or folded and plain metal plates of a monolithic support matrix and to fasten this matrix in a metal casing jacket. Substantially less time and equipment is required than in the case of methods used in the prior art. In addition, the method of the present invention does not involve any safety risks. The matrix which, according to the invention, is disposed in a casing and coated with a catalysis promoting metal oxide has an unexpectedly high mechanical stability in comparison to known matrices, which stability may be observed from the measurement of the force required to press out the end faces of the sheet connections.

The present invention is further taught in the following specific examples.

EXAMPLE 1

(Comparative Example)

A metal support matrix of an alloy consisting of 15% chromium, 4% aluminum and the remainder iron, having a diameter of 60 mm and a length of 76.2 mm and having 46 cells/$cm^2$, produced by the spiral winding of a plain sheet and a corrugated sheet, is welded at its end face by an electron beam after insertion in a metallic casing. The connection between the matrix and the casing also is effected by electron beam welding, and in effect in the form of a spiral as shown in FIG. 4a. In order to provide a surface which is suitable for anchoring, the casing containing the support matrix is heated in a gas containing oxygen for 3 hours at 950° C. After cooling, coating with activated $Al_2O_3$ is carried out in accordance with the wash coat method. The dispersion agent is then dried off and the coated body is calcined.

EXAMPLES 2-6

(In accordance with the invention)

In each example a matrix as described and produced in Example 1 is welded at its end faces, as shown in FIG. 1, by means of a suitable apparatus, after the production of the alternating deformed and plain sheets. For this purpose an alternating current of approximately 240 A is passed through the matrix for approximately 2-3 seconds, at a voltage of 220 V. This process is repeated several times with rotation of the body to be welded about its cylindrical axis. In this way the welding of the first lower end face is carried out. After reversing the matrix, the procedure is carried out in the same way for the second, now lower, end face. When the two end faces are welded, the matrix is disposed in a suitable metal casing or sleeve. Connection to the casing by welding is then carried out by the so-called WIG (wolfram-inert gas method), as shown in FIG. 2, in accordance with one of the weld variants shown in FIG. 4. This welding takes place with alternating or direct current of 220 V at a current strength of 40 A. The coating with $Al_2O_3$ is carried out in the same way as in Example 1.

EXAMPLE 3

The catalyst supports produced in accordance with Examples 1 and 2 to 6 were tested on a test machine (Instron) for measuring the pressing force required in units of Newton by means of a press to displace the fastened layers. The results are given in the folowing Table 1.

TABLE 1

Pressing out force of the different embodiments

| Example | Fig. No. | Pressing out force (N) |
|---|---|---|
| 1 | 4d | 9,123 |
| 2 | 4b | 8,927 |
| 3 | 4d | 16,284 |
| 4 | 4e | 14,322 |
| 5 | 4a | 19,620 |
| 6 | 4c | 20,110 |

As can be seen from the examples, a composite body of a metal support and a wash coat may be produced in accordance with the method of the present invention at a lower cost, this body having at least the same pressing out forces as known composite bodies. Pressing out forces which are greater by 100% or more may be obtained with the same embodiment as the comparative example or other variants.

What is claimed is:

1. In the method of manufacturing a mechanically stable, monolithic metal matrix having a vertical axis and opposed end faces and which is coated with a catalysis promoting metal oxide, is disposed in a metal jacket and comprises alternately superposed plain and corrugated or folded metal sheets of scale-resistant and high temperature resistant metal and in which the metal sheets are stacked in a pile or wound into a spiral, the improvement which comprises disposing one of the end faces of the matrix on a base electrode plate connected to one pole of a current source, and disposing the other, opposite end face on a second cover electrode plate connected to the other pole of the current supply, passing a welding current through the arrangement of matrix and electrode plates once or a plurality of times to weld the metal plates at said end face disposed on said base electrode plate, then disposing the matrix in a way whereby the initially upper end face which is still unwelded lies on the base electrode plate and repeating the welding process, disposing and then welding the matrix in the metal jacket by means of an electric arc guided over the metal jacket in accordance with a predetermined weld path with the incorporation of at least one outer metal sheet of said matrix, and coating the interior of the composite body thereby obtained with a catalysis promoting metal oxide.

2. A method as claimed in claim 1 wherein a base electrode plate provided with grooves is used.

3. A method as claimed in claim 2 wherein a cover electrode plate provided with grooves is used.

4. A method as claimed in claim 1 wherein a cover electrode plate provided with grooves is used.

5. A method as claimed in claims 2, 3 or 4 wherein the spacings between the raised portions separating the grooves correspond to the spacings between the plain metal sheets of the matrix.

6. A method as claimed in claim 5 wherein during the end face welding several welding currents are passed through the arrangement and between each of said currents the matrix lying on the base electrode plate is rotated slightly about its vertical axis.

7. A method as claimed in claim 2, 3 or 4 wherein during the end face welding several welding currents are passed through the arrangement and between each of said currents the matrix lying on the base electrode plate is rotated slightly about its vertical axis.

8. A method as claimed in claim 1 wherein a protective gas is used during the welding processes.

9. A method as claimed in claim 8 wherein a dispersion of a catalysis promoting metal oxide is applied to the composite body welded at its end faces and on its jacket side and as yet uncoated, the dispersion agent is removed by drying and the coated body is then calcined.

10. A method as claimed in claim 7 wherein a dispersion of a catalysis promoting metal oxide is applied to the composite body welded at its end faces and on its jacket side and as yet uncoated, the dispersion agent is removed by drying and the coated body is then calcined.

11. A method as claimed in claim 6 wherein a dispersion of a catalysis promoting metal oxide is applied to the composite body welded at its end faces and on its jacket side and as yet uncoated, the dispersion agent is removed by drying and the coated body is then calcined.

12. A method as claimed in claim 5 wherein a dispersion of a catalysis promoting metal oxide is applied to the composite body welded at its end faces and on its jacket side and as yet uncoated, the dispersion agent is removed by drying and the coated body is then calcined.

13. A method as claimed in claim 2, 3 or 4 wherein a dispersion of a catalysis promoting metal oxide is applied to the composite body welded at its end faces and on its jacket side and as yet uncoated, the dispersion agent is removed by drying and the coated body is then calcined.

14. A method as claimed in claim 9 wherein a scale-resistant and high temperature resistant chromium steel alloy containing the element aluminum is used at least for the matrix.

15. A method as claimed in claim 8 wherein a scale-resistant and high temperature resistant chromium steel alloy containing the element aluminum is used at least for the matrix.

16. A method as claimed in claim 7 wherein a scale-resistant and high temperature resistant chromium steel alloy containing the element aluminum is used at least for the matrix.

17. A method as claimed in claim 6 wherein a scale-resistant and high temperature resistant chromium steel alloy containing the element aluminum is used at least for the matrix.

18. A method as claimed in claim 5 wherein a scale-resistant and high temperature resistant chromium steel alloy containing the element aluminum is used at least for the matrix.

19. A method as claimed in claims 2, 3 or 4 wherein a scale-resistant and high temperature resistant chromium steel alloy containing the element aluminum is used at least for the matrix.

20. A method as claimed in claim 14 wherein the composite body is pre-annealed in an atmosphere containing oxygen at a temperature between 600° and 1200° C. before being coated with the metal oxide.

21. A method as claimed in claim 9 wherein the composite body is pre-annealed in an atmosphere containing oxygen at a temperature between 600° and 1200° C. before being coated with the metal oxide.

22. A method as claimed in claim 8 wherein the composite body is pre-annealed in an atmosphere containing oxygen at a temperature between 600° and 1200° C. before being coated with the metal oxide.

23. A method as claimed in claim 7 wherein the composite body is pre-annealed in an atmosphere containing oxygen at a temperature between 600° and 1200° C. before being coated with the metal oxide.

24. A method as claimed in claim 6 wherein the composite body is pre-annealed in an atmosphere containing oxygen at a temperature between 600° and 1200° C. before being coated with the metal oxide.

25. A method as claimed in claim 5 wherein the composite body is pre-annealed in an atmosphere containing oxygen at a temperature between 600° and 1200° C. before being coated with the metal oxide.

26. A method as claimed in claims 2, 3 or 4 wherein the composite body is pre-annealed in an atmosphere containing oxygen at a temperature between 600° and 1200° C. before being coated with the metal oxide.

* * * * *